United States Patent [19]

Nakada et al.

[11] Patent Number: 6,015,213
[45] Date of Patent: Jan. 18, 2000

[54] RING FOR A HARD CONTACT LENS AND HARD CONTACT LENS COMPOSITE EMPLOYING SUCH A RING

[75] Inventors: Kazuhiko Nakada; Akihisa Sugiyama, both of Kasugai, Japan

[73] Assignee: Menicon Co., Ltd., Nagoya, Japan

[21] Appl. No.: 09/089,503

[22] Filed: Jun. 3, 1998

[30] Foreign Application Priority Data

Jun. 27, 1997 [JP] Japan ................... 9-172238

[51] Int. Cl.⁷ ....................................... G02C 7/04
[52] U.S. Cl. ................... 351/172; 523/106; 523/107; 351/160 H; 424/429; 604/294
[58] Field of Search ................... 523/106, 107; 351/160 H, 172; 604/294; 424/429

[56] References Cited

U.S. PATENT DOCUMENTS

| 3,957,049 | 5/1976 | Neefe . | |
|---|---|---|---|
| 3,973,838 | 8/1976 | Page . | |
| 4,166,255 | 8/1979 | Graham . | |
| 4,532,267 | 7/1985 | Allan | 523/106 |
| 4,640,941 | 2/1987 | Park et al. | 523/107 |

FOREIGN PATENT DOCUMENTS

| 2 219 430 | 9/1974 | France . |
| 2 308 144 | 8/1974 | Germany . |

*Primary Examiner*—Andrew E. C. Merriam
*Attorney, Agent, or Firm*—Oblon, Spivak, McClelland, Maier & Neustadt, P.C.

[57] ABSTRACT

A ring for a hard contact lens, which can be detachably attached to the peripheral edge of a hard contact lens and which has a groove of a shape corresponding to the peripheral edge of the hard contact lens, formed along the inner periphery of the ring.

12 Claims, 1 Drawing Sheet

RING FOR A HARD CONTACT LENS AND HARD CONTACT LENS COMPOSITE EMPLOYING SUCH A RING

The present invention relates to a ring for a hard contact lens and a hard contact lens composite employing such a ring. More particularly, it relates to a soft or flexible ring for a hard contact lens, which is designed to be attached to the peripheral edge of a hard contact lens, particularly a multi-focal hard contact lens, to improve the stability of the lens and the comfortableness to the wearer, and a hard contact lens composite employing such a ring.

Heretofore, there have been cases where a patient gives up wearing a hard contact lens, because the hard contact lens is poor in comfortableness to the wearer as compared with a soft contact lens, or a patient stops wearing a hard contact lens because of a miner problem on the cornea, such as 3–9 stain. Under the circumstances, it was proposed to improve the comfortableness to the wearer of a hard contact lens by making the periphery of the lens to be soft (JP-A-3-92336, and JP-A-4-45420).

However, such a lens was difficult to produce and thus had a problem that its cost was high. Further, it had an optical problem that its optical region became narrow.

It was also proposed to attach a soft edge to a hard contact lens by polymerization or bonding (JP-A-49-120655, and JP-Y-40-1455). However, it was rather difficult to bond different types of materials, whereby there was a problem of costs, or a problem of poor optical properties. Further, it was proposed to detachably attach a hard contact lens on the outer surface of a soft contact lens base (JP-U-49-95955, JP-U52-52955, and JP-U-53-22337). However, there were drawbacks such that the center thickness increased, and the oxygen permeability was hindered by the base, so that no adequate oxygen permeability was expected. Furthermore, a composite contact lens was proposed wherein instead of the base, an opening was provided at the center, and an optical member made of inorganic glass was fitted in the opening (JP-A-57-11652). However, as the optical member to be used, a currently available commercial product could not be used, and it had to be separately produced as a special part, thus leading to a problem that the production cost tended to be high.

Under these circumstances, it is an object of the present invention to provide a ring for a hard contact lens which can easily be prepared and which is able to improve the stability of a hard contact lens and the comfortableness to the wearer, and a hard contact lens composite employing such a ring.

The ring for a hard contact lens of the present invention is a ring which can be detachably attached to the peripheral edge of a hard contact lens and which has a groove of a shape corresponding to the peripheral edge of the hard contact lens, formed along the inner periphery of the ring.

The hard contact lens composite of the present invention comprises a hard contact lens and the above ring for a hard contact lens attached to the peripheral edge of the hard contact lens.

Further, the hard contact lens composite of the present invention is characterized in that the length of an upper flange engaged with the front side of the peripheral edge of the hard contact lens, is shorter than the length of a lower flange engaged with the rear side of the peripheral edge of the lens.

Now, with reference to the accompanying drawings, the ring for a hard contact lens of the present invention and the hard contact lens composite employing such a ring, will be described.

BRIEF DESCRIPTION OF THE DRAWINGS

In the accompanying drawings:

As shown in FIGS. 1 to 3, a ring 1 for a hard contact lens has a groove 4 of an edge shape corresponding to the peripheral edge 3 of a hard contact lens CL, formed along its inner periphery 2. The ring 1 has a circular shape and designed to be detachably attached to the peripheral edge 3 of the hard contact lens CL. The inner diameter of the ring 1 is smaller by at least 0.05 mm than the outer diameter of the hard contact lens CL so as to facilitate attaching and detaching.

The above ring 1 is detachably attached, whereby cleaning, disinfection or replacement of the lens can easily be carried out.

As the hard contact lens to be used in the present invention, a common commercial product can be used. For example, it is preferred to employ a hard contact lens with Dk/L (oxygen permeability/thickness of the lens center (cm)) being at least $20 \times 10^{-9}[(cm/sec) \cdot (mlO_2/(ml \times mmHg))]$, which is able to supply adequate oxygen to the cornea.

The material of the above ring 1 is preferably a soft material to improve the comfortableness to the wearer. Such a soft material may, for example, be a copolymer of at least one component selected from water-containing materials, such as a hydroxyalkyl acrylate or a hydroxyalkyl methacrylate, such as hydroxyethyl acrylate or hydroxyethyl methacrylate; an N,N-dialkylacrylamide and an N,N-dialkylmethacrylamide, such as N,N-dimethylacrylamide; and an N-vinylactam such as N-vinylpyrrolidone, a polysaccharide such as dextran, cellulose, starch or gum arabic, crosslinked by e.g. sodium hyaluronate or chondroitin sulfuric acid, or a no-water containing material such as silicone rubber, urethane rubber, an acrylic copolymer or a methacrylic copolymer.

Figure 4:
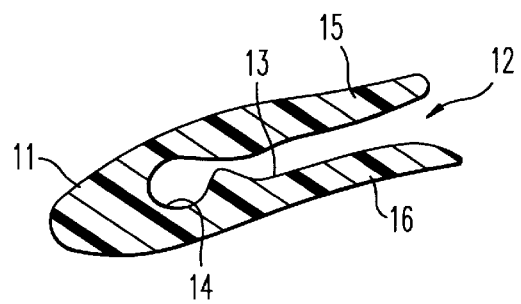
FIG. 4 is a cross sectional view showing another embodiment of the ring for a hard contact lens of the present invention.

In an embodiment of the present invention, the ring preferably has a means for gradually releasing a drug. Such a means for gradually releasing a drug may, for example, be one having a drug coated on the ring, or one having a drug impregnated in the ring. The impregnation method may, for example, be a method of directly immersing the ring in the drug, a method of coating the drug on the ring, a method of incorporating the drug in the above mentioned soft material, followed by molding to prepare a ring, or a method of adding a blowing agent to the above mentioned soft material, followed by molding to obtain a ring, whereupon the drug is impregnated thereto by vacuum. Otherwise, as shown in FIG. 4, as a means for gradually releasing the drug, a pocket 14 capable of retaining a drug, which is formed between the peripheral edge of the hard contact lens and the inner periphery 12 of the ring 11 i.e. at the bottom of the groove 13, may be employed. The drug in this pocket 14 is designed to ooze out from a clearance between the hard contact lens and the ring by a capillary action to the cornea.

The above drug may, for example, be a common ophthalmic agent as disclosed in e.g. JP-A-8-104636, JP-B-59-

7684 or JP-A-7-503974, such as lacrimation increasing agent, a cell propagation accelerator, a suppressant against increase of the corneal thickness, a mydriatic, a miotic, an antibiotic, a fungicide, an antihistamine, an antiinflammatory agent, an anticholinergic, an antiglaucoma compound, an anthelminthick compound, an antivirus agent, a carbonate dehydrarase inhibitor, an antifungal agent, an anaesthetic agent, a peptide or a protein, which is used as a preventive or curing agent for an eye trouble (such as inflammation) or wound, a diagnostic agent or an immunosuppressive agent.

Figure 5:
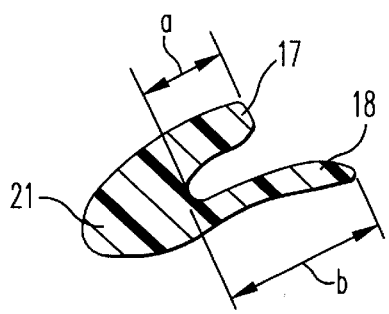
FIG. 5 is a cross sectional view showing still another embodiment of the ring for a hard contact lens of the present invention.

In each of the embodiments shown in FIGS. 1 to 4, the cross section of the ring 1 or 11 has a U-shape, and an upper flange 5 or 15 engageable with the front side of the peripheral edge of the above lens has substantially the same length as the lower flange 6 or 16 engageable with the rear side of the peripheral edge of the lens. However, the present invention is not limited to such a structure. For example, as shown in FIG. 5, the length a of the upper flange 17 may be shorter than the length b of the lower flange 18. For example, it is preferred that b-a=0.2 to 2.0 mm. By making the length of the upper flange 17 shorter than the length of the lower flange 18, the ring 21 can more readily be attached or detached than the above ring 1 or 11.

Now, the hard contact lens composite employing the ring for a hard contact lens of the present invention, will be described in detail with reference to Examples. However, it should be understood that the present invention is by no means restricted to such specific Examples.

EXAMPLE 1

Figure 1:
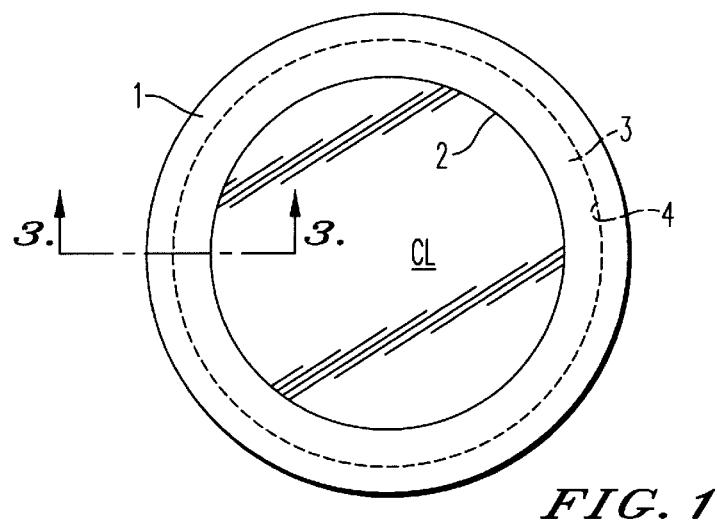
FIG. 1 is a plan view showing an embodiment of the ring for a hard contact lens of the present invention.
Figure 2:
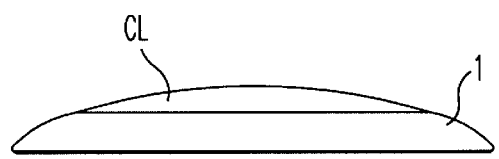
FIG. 2 is a side view of the lens in FIG. 1.
Figure 3:
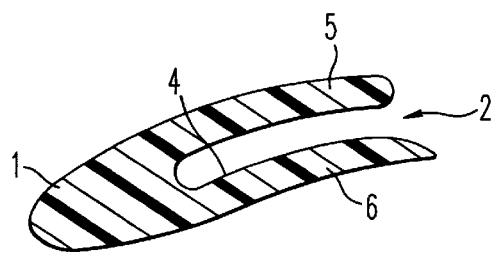
FIG. 3 is a cross sectional view of the ring in FIG. 1.

Firstly, using addition type silicone oil KE106, manufactured by Shinetsu Chemical Industry Co., Ltd., a ring as shown in FIGS. 1 to 2 was prepared by molding. This ring was attached to the peripheral edge of a contact lens Menicon EX, manufactured by Menicon Co., Ltd.

Then, the obtained composite was put on an eye of a person.

As a result, it was reported that good stability and comfortableness like a soft lens were obtained.

EXAMPLE 2

Firstly, 2-hydroxyethyl methacrylate/N-vinylpyrrolidone/ ethylene glycol dimethacrylate=9/1/0.1 (weight ratio) were polymerized to obtain a ring shaped polymer, which was subjected to cutting work to obtain a ring as shown in FIG. 4. After hydration treatment, this ring had a water content of 45% and was flexible. This ring was attached to the same lens as in Example 1. It was easy to attach and detach the ring.

Then, such a composite was put on an eye of a person.

As a result, it was reported that good stability and comfortableness like a soft lens were obtained.

EXAMPLE 3

A ring was prepared in the same manner as in Example 2. Then, it was immersed in an ophthalmic solution made of a 5% hydrochloric acid calteorol aqueous solution for one hour, and then the ring was attached to the same lens as in Example 1.

Then, such a composite was put on an eye of a rabbit, and 36 hours later, the intraocular tension was measured.

As a result, the intraocular tension was lower than prior to wearing the composite, whereby it was confirmed that wearing was comfortable, and the drug was effective.

EXAMPLE 4

A ring was prepared in the same manner as in Example 1. Then, an ophthalmic solution made of a 5% hydrochloric acid calteorol aqueous solution was filled in a pocket inside of the ring, and then the ring was attached to the same lens as in Example 1.

Then, such a composite was put on an eye of a rabbit, and 36 hours later, the intraocular tension was measured.

As a result, the intraocular tension was lower than prior to wearing the composite, whereby it was confirmed that wearing was comfortable, and the drug was effective.

As described in the foregoing, according to the present invention, the ring can be attached to a commercially available hard contact lens, whereby stability of the hard contact lens and comfortableness to the wearer can be improved at a low production cost. Further, by gradually releasing a drug from the ring, it is possible, for example, to reduce the intraocular tension.

What is claimed is:

1. A ring for a hard contact lens, which can be detachably attached to the peripheral edge of a hard contact lens and which has a groove of a shape corresponding to the peripheral edge of the hard contact lens, formed along the inner periphery of the ring, wherein in the ring, the length of an upper flange engageable with the front side of the peripheral edge of the hard contact lens, is shorter than the length of a lower flange engageable with the rear side of the peripheral edge of the lens.

2. The ring for a hard contact lens according to claim 1, wherein a pocket is formed at the bottom of the groove.

3. The ring for a hard contact lens according to claim 1, wherein the ring is made of a soft material.

4. The ring for a hard contact lens according to claim 3, wherein the soft material is a copolymer of at least one component selected from a hydroxyalkyl acrylate, a hydroxyalkyl methacrylate, an N-vinyllactam, an N,N-dialkyl acrylamide and an N,N-dialkyl methacrylamide.

5. The ring for a hard contact lens according to claim 3, wherein the soft material is a crosslinked polysaccharide.

6. The ring for a hard contact lens according to claim 3, wherein the soft material is a silicone rubber or an acrylate copolymer.

7. A hard contact lens composite comprising a hard contact lens and the ring for a hard contact lens as defined in claim 1, which is attached to the peripheral edge of the hard contact lens.

8. The hard contact lens composite according to claim 7, wherein the ring has a means for gradually releasing a drug.

9. The hard contact lens composite according to claim 8, wherein the means for gradually releasing a drug is one having a drug impregnated in the ring.

10. The hard contact lens composite according to claim 8, wherein the means for gradually releasing a drug is a pocket capable of retaining a drug between the peripheral edge of the hard contact lens and the inner periphery of the ring.

11. A ring for a hard contact lens, which can be detachably attached to the peripheral edge of a hard contact lens and which has a groove of a shape corresponding to the peripheral edge of the hard contact lens, formed along the inner periphery of the ring, wherein a pocket is formed at the bottom of said groove.

12. The ring for a hard contact lens of claim 11, wherein said pocket is capable of retaining a drug between the peripheral edge of the hard contact lens and the inner periphery of the ring.

* * * * *